United States Patent [19]

Spencer

[11] 4,414,995
[45] Nov. 15, 1983

[54] THREE-WAY HYDRAULIC CONTROLLER

[76] Inventor: Larry K. Spencer, 1204 Tappan Cir., Carrollton, Tex. 75006

[21] Appl. No.: 366,605

[22] Filed: Apr. 8, 1982

[51] Int. Cl.³ .............................................. F16K 13/04
[52] U.S. Cl. ..................................... 137/77; 137/556; 137/596.18; 137/627.5; 251/14
[58] Field of Search .............. 137/73, 77, 556, 596.18, 137/627.5; 251/14

[56] References Cited

U.S. PATENT DOCUMENTS

| | | | |
|---|---|---|---|
| 3,115,330 | 12/1963 | Dollison | 137/627.5 X |
| 3,618,627 | 11/1971 | Wagner | 137/73 |
| 4,108,372 | 8/1978 | Brakebill | 137/627.5 X |
| 4,240,455 | 12/1980 | McGee | 251/14 X |
| 4,306,586 | 12/1981 | Spencer | 137/556 |

Primary Examiner—Harold W. Weakley
Attorney, Agent, or Firm—Gerald G. Crutsinger; John F. Booth; Monty L. Ross

[57] ABSTRACT

A controller comprises a body having a first port, a second port and a third port. A valve element is disposed in the body for movement between a first position which blocks fluid flow through the first port while permitting fluid communication between the second and third ports and a second position to permit fluid communication between the first and second ports while blocking fluid flow through the third port. A device is disposed in the body for urging the valve element to the second position. A mechanism is connected to the body for moving the valve element to the second position and this moving apparatus includes a member which when heated permits the urging device to move the valve member to the first position. Indicator means are provided to indicate position of the valve element. Safety means is provided to avoid accidental movement of the valve element to the second position during manual operation.

12 Claims, 5 Drawing Figures

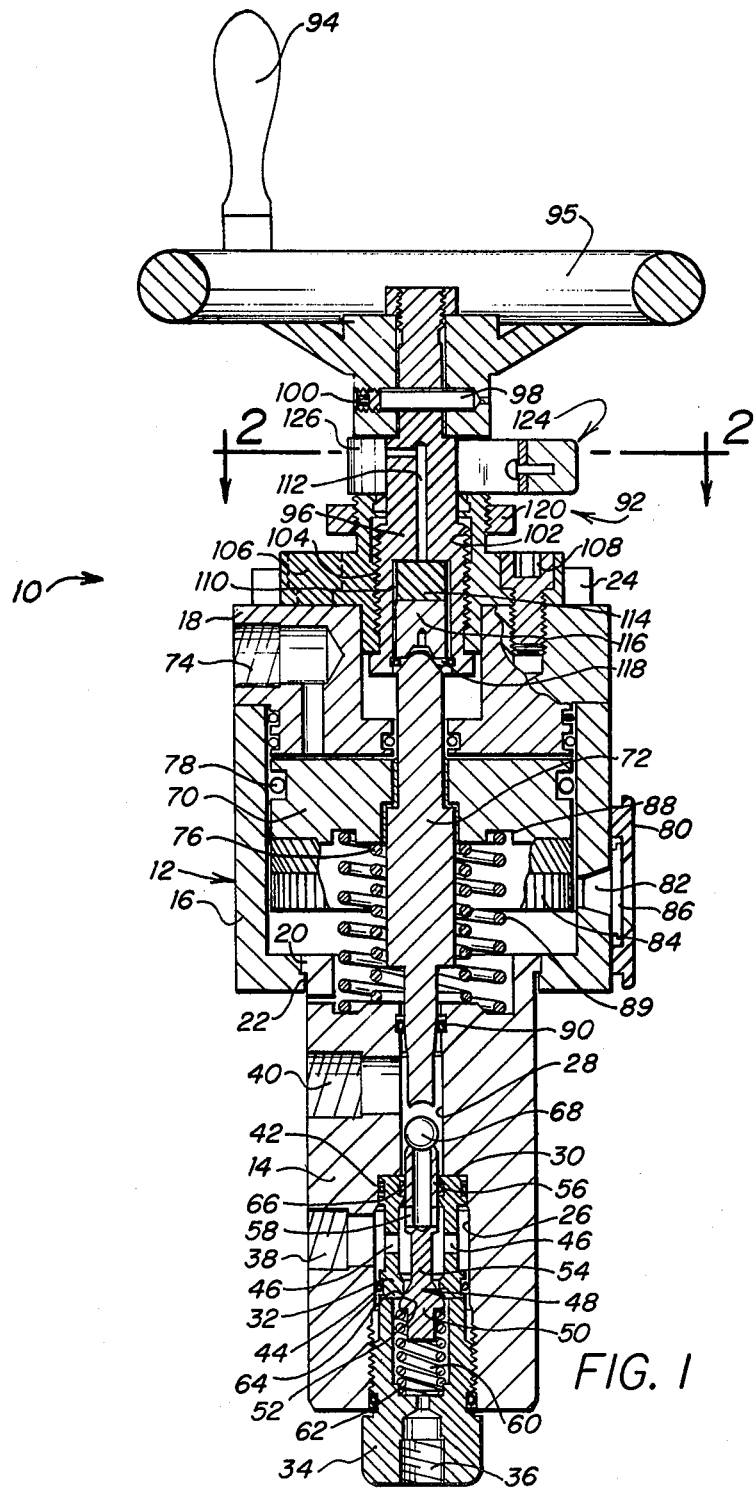
FIG. I

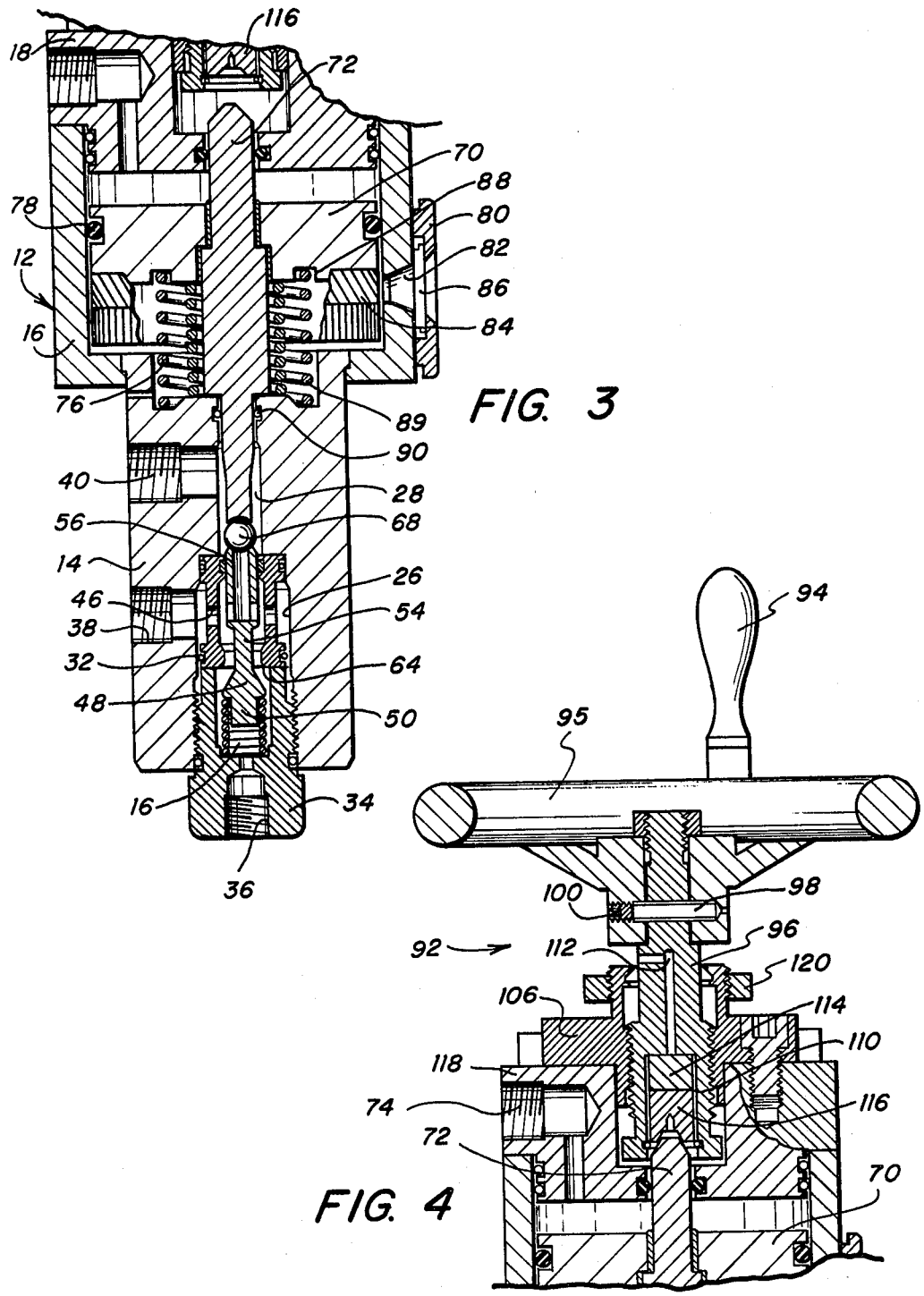

THREE-WAY HYDRAULIC CONTROLLER

TECHNICAL FIELD

This invention relates to a hydraulic controller, and more particularly, to a three-way normally closed hydraulic controller operated by pilot pressure. One aspect of the invention relates to a controller having a manual override mechanism for use in the absence of pilot pressure and having means for blocking and bleeding hydraulic pressure when the controller is subjected to elevated temperature while the override mechanism is engaged. A further aspect of the invention relates to a three-way hydraulic controller having means for indicating the relative position of the internal valve elements and having safety means for indicating whether or not the override mechanism is engaged.

BACKGROUND OF THE INVENTION

Three-way normally closed hydraulic controllers are well known. These controllers are useful in many applications, including use in hydraulic control loops for oil field flow lines. They can be installed, for example, on hydraulic fluid lines supplying hydraulic pressure to flow line safety valves. One such controller is sold by Sigma Enterprises, Inc., of Dallas, Tex., under Assembly No. 20HM24. The 20HM24 controller comprises a supply port, a valve port and an exhaust port, and is adapted by means of an internal valve to selectively provide fluid communication between the valve port and either the supply port or the exhaust port.

The supply port is ordinarily connected to a source of pressurized hydraulic fluid. The valve port is typically connected to a flow line valve such as a flow line safety valve. When the valve port and supply port are in fluid communication, hydraulic pressure is exerted on the flow line valve, causing the flow line to remain open. When the valve port and exhaust port are in fluid communication, the hydraulic pressure from the supply source is blocked, and the pressure on the flow line valve is bled off through the exhaust valve of the controller, causing the flow line valve to close. For safety reasons, the controller is designed so that the valve port and supply port are not in fluid communication unless another external force is exerted against the internal valve of the controller. This feature give rise to the term "normally closed." Under standard operating conditions, pressurized fluid also communicates through pilot lines between remote sensors and the pilot port of the controller. When no alarming condition exists that is sufficient to trip the remote sensors, the fluid pressure exerted through the pilot port of the controller acts against the "normally closed" internal valve to provide fluid communication between the valve port and the supply port. If pilot pressure subsequently fails, the internal valve automatically reverts to its "normally closed" position.

In working with such control systems, it is sometimes desirable to maintain fluid communication between the valve and supply ports in the controller even in the absence of pilot pressure while permitting operation of the continued primary flow line. This situation might exist, for example, if it were necessary to repair or replace a portion of the pilot pressure system. Also, it is sometimes desirable to operate the controller in a hydraulic trap system where no pilot pressure is available. A manually operated override mechanism is employed in the 20HM24 to permit the operator to hold the internal valve in its "open" position.

However, in spite of the capabilities of the prior art devices, certain disadvantages have also been encountered during their use and operation. One disadvantage occurs when the conventional controller is subjected to elevated temperatures while the override mechanism is engaged. In such an instance it might be impossible to manually disengage the override mechanism, and thereby block and bleed the fluid pressure to the flow line valve. Another disadvantage of conventional controllers relates to the difficulty experienced by operators in determining by a visual inspection of the controller whether the internal valve is in the "in service" or "block and bleed" position, and if in service, whether or not the manual override is engaged.

A three-way normally closed hydraulic controller is therefore needed that will automatically revert to the "block and bleed" configuration when subjected to elevated temperatures while the manual override is engaged. A three-way normally closed hydraulic controller is also needed that will permit the operator to tell by visual inspection of the controller whether the internal valve is in the "in service" or "block and bleed" position and whether or not the manual override is engaged.

SUMMARY OF THE INVENTION

According to the present invention, a three-way normally closed hydraulic controller is provided that comprises a fusible link which will permit actuation of the controller in the event of fire even if the manual override mechanism is engaged.

According to one embodiment of the invention, a visual indicator flag is provided that indicates the relative position of the valve mechanism within the controller through a panel mounted window. In a particularly preferred embodiment of the invention, the visual indicator mechanism comprises a red flag for designating when the internal valve mechanism is in the "block and bleed" condition, and a green flag for indicating when the internal valve mechanism is in the "in service" or "override" configuration.

According to another embodiment of the invention, a three-way normally closed hydraulic controller is provided that comprises a manual override mechanism and means for determining by visual inspection whether or not the override mechanism is engaged. Such means also desirably serves as a safety device to guard against accidental engagement of the override mechanism.

In accordance with the subject invention, a three-way normally closed hydraulic controller is provided that comprises a body defining a supply port, a valve port, an exhaust port and a pilot port. In the absence of pilot pressure, a slidably movable spring-loaded valve seat disposed within the body is adapted to permit fluid communication between the valve and exhaust ports while blocking fluid communication between the valve and supply ports. When subjected to adequate pilot pressure, the slidably movable valve seat is repositioned so as to permit fluid communication between the valve and supply ports while blocking fluid communication between the valve and exhaust ports. The subject controller is further adapted by means of an override mechanism to urge the slidably movable valve seat into that position permitting fluid communication between the valve and supply ports even in the absence of pilot pressure. The override mechanism is preferably adapted by means of a heat responsive device to permit the spring-loaded valve element to return to the position permitting fluid communication between the valve and exhaust ports and blocking fluid communication between the valve and supply ports in the event of fire.

Other objects and advantages of the invention will become apparent upon reading the detailed description of the invention with reference to the accompanying drawings.

BRIEF DESCRIPTION OF THE DRAWINGS

The detailed description is better understood with reference to the following drawings wherein like reference characters are used throughout to designate like parts:

FIG. 1 is a sectional elevation view of the three-way normally closed hydraulic controller of the present invention in the operational mode wherein no pilot pressure is being exerted against the internal valve means, wherein the manual override mechanism is not engaged, wherein fluid communication between the valve and supply ports is blocked, and wherein fluid communication between the valve and exhaust ports is permitted;

FIG. 3 is a sectional elevation view of the lower portion of the three-way normally closed hydraulic controller of the present invention in the configuration wherein pilot pressure is being exerted against the internal valve means to block fluid communication between the valve and exhaust ports while permitting fluid communication between the valve and supply ports;

FIG. 4 is a sectional elevation view of the upper portion of the three-way normally closed hydraulic controller of the present invention in the configuration wherein there is no pilot pressure and the manual override mechanism is engaged.

DETAILED DESCRIPTION OF THE INVENTION

Figure 5:
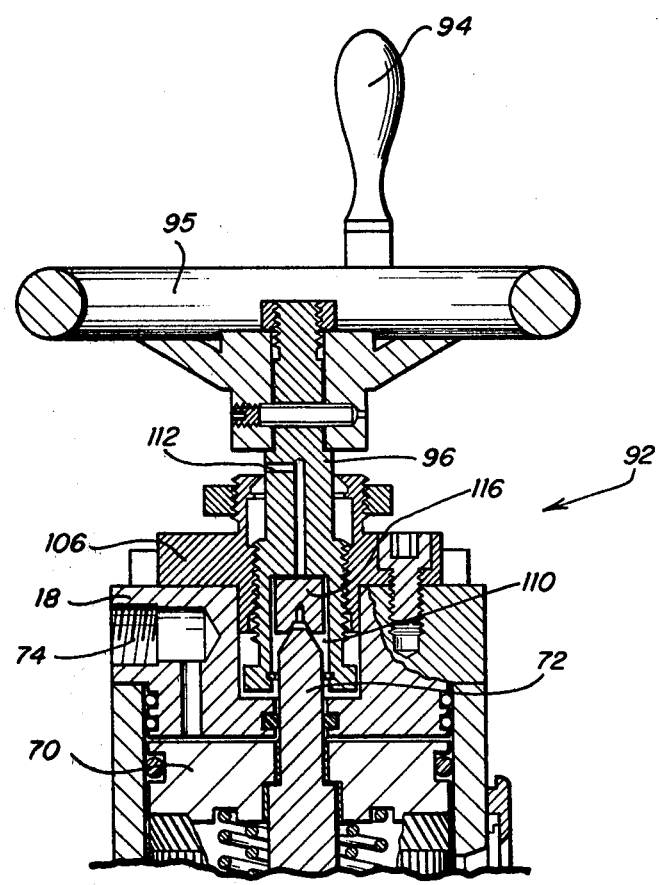
FIG. 5 is a sectional elevation view of the upper portion of the three-way normally closed hydraulic controller of the invention in the configuration wherein there is no pilot pressure, wherein the manual override mechanism is engaged, and wherein the fusible element within the manual override mechanism has melted, permitting the piston and plunger to be forced upward, simultaneously blocking fluid communication between the valve and supply ports and permitting fluid communication between the valve and exhaust ports of the controller.

Referring to FIG. 1, there is shown a three-way normally closed controller 10 constructed according to the present invention. Controller 10 comprises body 12 further comprising lower housing 14, upper housing 16 and pilot cover 18. Lower housing 14 is connected to upper housing 16 by means of an annular shoulder 20 resting on an annular lip 22. Pilot cover 18 is connected to upper housing 16 by use of a plurality of cap screws 24.

Lower housing 14 includes a first bore 26 and a smaller diameter second bore 28 with an annular shoulder 30 disposed between the first and second bores.

A conventional valve spool 32 is disposed within first bore 26 and is held in place by retaining element 34 threadedly connected within bore 26 of lower housing 14. A first or supply port 36 is disposed longitudinally through retaining element 34 to provide fluid communication into first bore 26. A second or valve port 38 extends through the side of lower housing 14 to provide fluid communication with first bore 26 and a third or exhaust port 40 extends through the side of lower housing 14 to provide fluid communication with second bore 28. An upper O-ring seal 42 and a lower O-ring seal 44 are provided around the periphery of spool 32 and on either side of valve port 38 to prevent fluid leakage around the spool. If desired, retaining rings (not shown) may be provided to aid in retaining O-ring seals 42 and 44 within their respective grooves. A passageway 46 is provided through the side walls of spool 32 and preferably generally aligned with the center line of valve port 38.

A valve seat element 48 is disposed within lower housing 14. Valve seat element 48 includes tang portion 50, shoulder 52 extending outwardly of tang portion 50, middle portion 54 disposed inwardly of shoulder portion 52, and tubular extending portion 56 extending past the end of spool 32, with passageway 58 extending through the walls of tubular portion 56 to thereby provide fluid communication between the interior passageway of tubular portion 56 and the interior passageway of valve spool 32.

A spring 60 is disposed around tang portion 50 and between an interior shoulder 62 provided on retaining element 34 and shoulder portion 52 of valve seat element 48. Spring 60 continuously urges shoulder portion 52 of valve seat element 48 into engagement with a shoulder 65 in valve spool 32 to thereby prevent fluid communication between supply port 36 and valve port 38. An O-ring 66 is annularly disposed about the interior passageway through spool 32 for engaging the outer wall of tubular portion 56 of valve seat element 48 to prevent fluid leakage into bore 28.

A ball 68 is disposed within bore 28 of lower housing 14 for seating on the upper edge of tubular portion 56 to prevent fluid flow through the interior passageway of tubular portion 56 into second bore 28. A piston 70 is disposed within upper housing 12 for exerting a force against a plunger 72 extending into bore 28 for engaging ball 68. Piston 70 is moved toward engagement with ball 68 by use of a pilot fluid entering through pilot port 74. A spring 76 is preferably disposed around plunger 72 for urging piston 70 and plunger 72 away from ball 68. Because it is desirable for piston 70 and plunger 72 to move in unison, they are preferably welded together. It is understood, however, that any similarly effective means for causing piston 70 and plunger 72 to move in unison is also within the scope of the present invention. Annular groove 88 is preferably provided in piston 70 to accommodate a second actuating spring 89 which provides redundant force with spring 76 to push piston 70 and plunger 72 to the top position. An O-ring seal 78 is disposed within an annular groove extending around the periphery of piston 70 for engaging with the interior of upper housing 16 to thereby prevent leakage of pilot fluid around piston 70. If desired, a retaining ring (not shown) can be provided to maintain O-ring 78 within the groove.

Further, apparatus can be provided in each valve 10 to indicate when the valve is permitting fluid communication between the supply and valve ports or between the valve and exhaust ports. This apparatus preferably comprises a face plate 80 covering an aperture 82 provided in a side wall of upper housing 16 so as to permit visual observation of a flag, band or ring 84 connected to piston 70. A window 86 is supported by face plate 80 so as to permit visual observation of ring 84 while preventing foreign material from passing into upper housing 16. Ring 84 is desirably provided with different colored bands or is lettered to indicate through window 86 whether piston 70 and plunger 72 are in the top, bottom, or some intermediate position.

An O-ring 90 is preferably disposed within an annular groove provided in second bore 28 for engaging plunger 72 to prevent leakage of fluid into upper housing 16.

Since it may be desirable to permit fluid communication between supply port 36 and valve port 38 even in the absence of pilot pressure, override mechanism 92 is provided. Override mechanism 92 preferably comprises handle 94 and handwheel 95 connected to shaft 96 by use of a pin 98, which is held in place by set screw 100. Threads 102 are provided on the exterior surface of shaft 96 to matingly engage threads 104 provided on the interior surface of override flange 106 which is connected to pilot cover 18 by use of a plurality of screws 108. A fusible link 114 is disposed within counterbore 110 that will desirably melt when controller 10 is subjected to elevated temperatures. The melting temperature of fusible link 114 can vary according to the intended use of controller 10. Passageway 112 is provided in counterbore 110 to permit the melted material from fusible link 114 to be expelled in the event of a fire while override mechanism 92 is engaged. A link of bearing link 116 is also disposed within counterbore 110 to contact the upper edge of plunger 72. A retaining ring 118 is disposed within an annular groove provided in counterbore 110 to prevent links 114 and 116 from dropping out of counterbore 110 when plunger 72 is down and override mechanism 92 is not engaged. The lower surface of bearing member 116, as shown in FIG. 3, is preferably adapted to the configuration of the upper edge of plunger 72 to assist in providing a bearing surface.

A panel nut 120 is provided for threadedly engaging with male threads disposed on an upwardly extending portion of override flange 106 for mounting controller 10 within an instrument panel. When mounting controller 10 within an instrument panel, it is desirable that an opening be provided to register with face place 80 to permit observation of ring 84.

Figure 2:
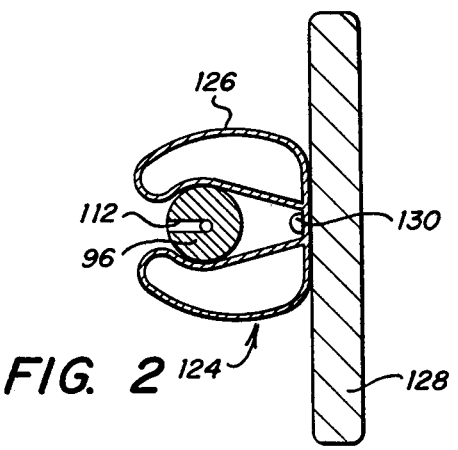
FIG. 2 is a sectional plan view depicting the override mechanism safety clip or indicator means in its installed position.

Referring to FIGS. 1 and 2, override mechanism 92 further comprises safety clip 124 that is disposed substantially around and in frictional engagement with shaft 96 whenever override mechanism 92 is not engaged. When positioned as shown in FIG. 1, safety clip 124 prevents engagement of override mechanism 92 except by conscious effort on the part of the operator. Safety clip 124 further comprises spring clip 126 and bar 128, which are connected by a suitable fastening means such as a screw, rivet, or the like. Whenever the operator desires to engage override mechanism 92, he should first grasp and pull bar 128, thereby causing spring clip 126 of safety clip 124 to release from around shaft 96. Shaft 96 is thereby permitted to threadedly advance downwardly into override flange 106 and pilot cover 18 when handle 94 and handwheel 95 are manually rotated by the operator. Once override mechanism 92 has been engaged, as shown in FIGS. 4 and 5, safety clip 124 cannot be reattached to shaft 96 until handle 94 and handwheel 95 have been rotated in the reverse direction, returning shaft 96 to its raised position in relation to override flange 106 and pilot cover 18. Thus, safety clip 124 provides a manual check for the operator to verify that override mechanism 92 is in the desired position. Whenever safety clip 124 is disposed around shaft 96, the operator is offered some assurance that controller 10 will respond to the various pilot pressure exhausting sensors in communication with pilot port 74 to actuate the high pressure hydraulic three-way valve elements in the lower portion of controller 10.

During operation of controller 10, supply port 36 is desirably connected to a pressurized source of hydraulic fluid; valve port 38 is desirably connected to a flow line valve; exhaust valve 40 is desirably connected to a suitable exhaust line; and pilot port 74 is desirably connected to a pressurized pilot system, although as previously mentioned, controller 10 is also designed to permit its application in a hydraulic trap system where there is no pilot pressure available.

Referring to FIG. 3, when pilot pressure is sufficient, piston 70 and plunger 72 are moved downwardly into engagement with ball 68 to seal the internal passage of tubular member 56 and to unseat shoulder portion 52 of valve seat element 48 from shoulder portion 64 of spool 32, which thereby permits fluid communication between supply port 36 and a valve port 38 while blocking fluid communication with exhaust port 40. When piston 70 and plunger 72 are in the downward or "in service" position, according to a preferred embodiment of the invention, a green band 84 is visible to the operator through aperture 82 in window 86 of controller 10.

Should pilot pressure be discontinued or fail, then piston 70 and plunger 72 are moved upwardly by springs 76 and 89 to the top position in upper housing 16, as shown in FIG. 1. This upward movement of piston 70 and plunger 72 allows shoulder portion 52 of valve seat 48 to engage with shoulder 64 of valve spool 32 to thereby permit fluid communication between valve port 38 and exhaust port 40, while blocking fluid communication between supply port 36 and valve port 38, as shown in FIG. 1. According to a preferred embodiment of the invention, when piston 70 and plunger 72 are in their top or "out of service" position, a red section of band 84 is visible to the operator through aperture 82 and window 86 of controller 10.

Since it may be desirable to permit fluid communication between supply port 36 and valve port 38 even in the absence of pilot pressure, override mechanism 92 is provided. Referring to FIG. 4, whenever there is insufficient pilot pressure to permit fluid communication between supply port 36 and valve port 38, handle 94 and handwheel 95 of override mechanism 92 are rotated to move shaft 96 downwardly within upper housing 16, thereby causing bearing link 116 in counterbore 110 to contact plunger 72 and move it downwardly into engagement with ball 68. Valve seat element 48 is then pressed downwardly by ball 68 against the opposing pressure of spring 60 to permit fluid communication between supply port 36 and valve port 38, while blocking fluid communication between valve port 38 and exhaust port 40.

However, when override mechanism 92 of controller 10 is engaged as shown in FIG. 4, it is desirable that apparatus be provided that in the event of fire will permit spring 60 to urge valve seat element 48 to the position wherein fluid communication between supply port 36 and valve port 38 is blocked. In order for valve seat element 48 to move upwardly so as to permit fluid communication between valve port 38 and exhaust port 40, it is first necessary that piston 70 and plunger 72 be returned to their top position by springs 76, 89. This is accomplished by providing fusible link 114 within counterbore 110. Fusible link 114 melts when subjected to elevated temperatures and is thereafter expelled through passageway 112 in shaft 96 as bearing link 116 is forced upward by plunger 72, as shown in FIG. 5. In this manner, it is possible to return controller 10 to the "block and bleed" configuration even though override mechanism 92 is engaged. Although melting feasible link 114 in counterbore 110 of shaft 96 of override mechanism 92 does not in itself actuate controller 10, it does permit controller 10 to actuate in response to normal pressure sensing, temperature sensing and manual controls. In actual operation, there are in fact usually several fusible elements situated in the vicinity of a controller such as controller 10, as well as other related apparatus which would liquefy to exhaust pilot pressure received through pilot port 74. In summary, fusible link 114 offers assurance that controller 10 will respond to the sensor elements in the event of a fire, even if override mechanism 92 has been engaged, purposely rendering controller 10 unresponsive to the other sensors.

While the present invention has been described in relation to its preferred embodiments, it is to be understood that various modifications thereof will be apparent to those of ordinary skill in the art upon reading the specification, and it is intended to cover all such modifications as fall within the scope of the appended claims.

The invention having been described, what is claimed is:

1. A three-way normally closed hydraulic controller comprising:
   a body having a first port, a second port and a third port;
   valve element means disposed in said body for movement between a position to block fluid flow through the first port while permitting fluid communication between the second and third ports and a position to permit fluid communication between the first and second ports while blocking fluid flow through the third port;
   means disposed in said body for urging said valve element means to the position where the fluid flow through the first port is blocked while permitting fluid communication between the second and third ports; and
   means connected to said body for moving said valve element means to the position wherein the first port is in fluid communication with the second port while fluid flow through the third port is blocked, said moving means including heat responsive means for permitting said urging means to move said valve element means to the position wherein the fluid flow through the first port is blocked while permitting fluid communication between the second and third ports whenever said controller is subjected to elevated temperatures.

2. A three-way controller as set forth in claim 1, wherein said moving means further includes a link of material adapted to melt when subjected to elevated temperatures, the link having a length sufficient to permit said controller element means to be moved to the position wherein flow through the first port is blocked while permitting fluid communication between the second and third ports after the link has melted.

3. A three-way controller as set forth in claim 1, wherein the heat responsive means includes a link of material adapted to melt when subjected to elevated temperatures and wherein said moving means includes a shaft having a counterbore for receiving the link of material and a passageway extending from the counterbore to permit the material to flow out of the controller when melted.

4. A three-way control valve comprising:
   a body having a supply port, a valve port, an exhaust port and a pilot port for receiving a pilot pressure therein;
   valve element means disposed in said body for movement between a position to block fluid flow through the supply port while permitting fluid communication between the valve and exhaust ports and a position to permit fluid communication between the supply and valve ports while blocking fluid flow through the exhaust port;
   means disposed in said body for urging said valve element means to the position with fluid flow through the supply port being blocked while permitting fluid communication between the second and third ports;
   means disposed within said body for acting against said urging means to move said valve element means to the position with the supply port being in fluid communication with the valve port while blocking fluid flow through the exhaust port in response to pilot pressure; and
   override means connected to said body for overriding said urging means to place the supply port in fluid communication with the valve port, said override means including heat responsive means for permitting said urging means to move said valve element means to prevent fluid communication between the supply and valve ports whenever said controller is subjected to elevated temperatures even though said override means is positioned to place the supply port in fluid communication with the valve port.

5. A control valve as set forth in claim 4, wherein said override means includes a link of material adapted to melt when subjected to elevated temperatures, the link having a length sufficient to permit said valve element means to be moved to the position with flow through the supply port being blocked while permitting fluid communication between the valve and exhaust ports after the link has melted.

6. A control valve as set forth in claim 4, wherein the heat responsive means includes a link of material adapted to melt when subjected to elevated temperatures and wherein said override means further includes a shaft having a counterbore for receiving the link of material and a passageway extending from the counterbore to permit the material to flow out of the controller when melted.

7. A control valve as set forth in claim 4, wherein said override means further includes a shaft having a counterbore containing means for supporting said heat responsive means and a bearing member disposed to engage a plunger member provided in said valve element means.

8. A control valve as set forth in claim 4, wherein said moving means includes a piston disposed to receive pilot pressure and a plunger connected to said piston for engaging said valve element means.

9. A control valve as set forth in claim 8, wherein said override means further includes a shaft having a counterbore adapted to support said heat responsive means and a bearing member disposed to engage a plunger member provided in said valve element means.

10. A three-way normally closed hydraulic controller as set forth in claim 1, wherein said moving means further includes indicator means for indicating through an aperture disposed in said controller when said valve element means is in the first or second position.

11. A three-way control valve as set forth in claim 4, further comprising indicator means for indicating through an aperture disposed in said control valve the position of said valve element means.

12. The apparatus of claim 4, further comprising means for indicating the position of said override means by visual inspection, said means being adapted to reduce the possibility of accidental movement of said override means to the override position.

* * * * *

UNITED STATES PATENT AND TRADEMARK OFFICE
CERTIFICATE OF CORRECTION

PATENT NO. : 4,414,995

DATED : November 15, 1983

INVENTOR(S) : Larry K. Spencer

It is certified that error appears in the above–identified patent and that said Letters Patent are hereby corrected as shown below:

Column 4, line 32, change "65" to -- 64 --

Signed and Sealed this

Sixth Day of March 1984

[SEAL]

Attest:

GERALD J. MOSSINGHOFF

Attesting Officer     Commissioner of Patents and Trademarks